J. RIDGE.

Lamp.

No. 3,595. Reissued Aug. 10, 1869.

WITNESSES

Chas. H. Smith

Geo. T. Pinkney

INVENTOR

Holmes, Booth & Haydens per L. W. Serrell

Atty.

N. PETERS, Photo-Lithographer, Washington, D. C.

United States Patent Office.

HOLMES, BOOTH & HAYDENS, OF WATERBURY, CONNECTICUT, ASSIGNEES, BY MESNE ASSIGNMENTS, OF JOSEPH RIDGE.

*Letters Patent No.* 34,984, *dated April* 15, 1862; *reissue No.* 2,855, *dated February* 4, 1868; *reissue No.* 3,595, *dated August* 10, 1869.

COAL-OIL LAMP.

The Schedule referred to in these Letters Patent and making part of the same.

*To all whom it may concern:*

Be it know that JOSEPH RIDGE, of Richmond, in the county of Wayne, and State of Indiana, did invent and make a certain Improvement in Lamps or Coal-Oil Burners; and the following is hereby declared to be a full, clear, and exact description of the same, reference being had to the annexed drawing, making part of this specification, wherein—

Similar marks of reference denote the same parts.

Figure 1:
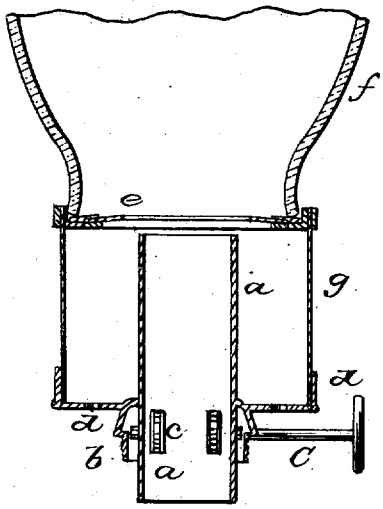
Figure 1 is a vertical section of said lamp.
Figure 2:
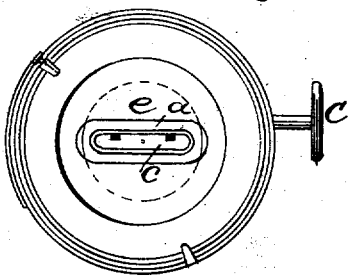
Figure 2 is a plan of the deflector.
Figure 3:
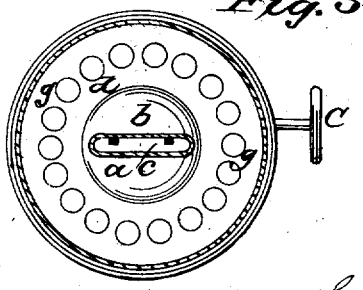
Figure 3 is a plan of the air-distributer.

In lamps and chimneys for candles, a deflector or draught-plate has been fixed within a glass chimney to direct the air upon the flame.

Lamps have also been made in which a chimney has been sustained upon a deflector above the wick-tube; but there was no transparent medium below and surrounding the wick-tube, to protect the same from currents of air, acting to render the flame unsteady; and in the class of lamps first named there was no protection at the lower end of the chimney or transparent cylinder around the wick-tube, to perform the duty of an air-distributer, to equalize the supply of air to the flame, and render the same steady, by checking undue action of external currents of air, which is very essential in properly burning kerosene and similar oils.

The nature of this invention consists in a lamp for kerosene or similar oils, formed of a draught-plate or deflector, with a flame-slot sustained above the wick-tube, in combination with a perforated or foraminous plate, surrounding the wick-tube, and forming an air-distributer, to regulate the supply of air to the burner; the parts being so constructed that the light from the flame can shine both above and below the deflector, and through the transparent material surrounding the wick-tube and flame.

In the drawing—

*a* represents the wick-tube, within the ring *b*, or thimble, that is fitted to be connected to the reservoir by a screw, or otherwise, and the same may also be closed in the form of a cap, to cover the ratchet or wick-raiser *c*.

The air-distributer *d* is around the wick-tube, and acts to regulate or determine the amount of air that passes into the burner to supply the combustion of the flame.

*e* is a deflector or draught-plate, having a flame-slot, and located above the wick-tube, to direct the air upon the flame;

*f* is the chimney, surrounding the flame; and

*g* the cylinder or transparent material enclosing the burner around the wick-tube.

In this lamp, the light shining below the deflector is allowed to pass out freely through the transparent material around the wick-tube, and the flame is protected from external currents of air, and a regular supply is admitted.

What is claimed, and to be secured by Letters Patent, is—

A lamp, for kerosene and other oils, formed of a draught-plate or deflector, with a flame-slot, in combination with a perforated air-distributer, the parts being so constructed that the light can shine through the transparent medium surrounding the flame and the wick-tube, substantially as set forth.

ISRAEL HOLMES, *President.*

Witnesses: A. S. CHASE, *Secretary.*

HOMER F. BASSETT,

CHAS. W. GILLETTE.